US012584599B2

(12) United States Patent
Zhang

(10) Patent No.: US 12,584,599 B2
(45) Date of Patent: Mar. 24, 2026

(54) LIGHTING FIXTURE

(71) Applicants: SUZHOU OPPLE LIGHTING CO., LTD., Suzhou City (CN); OPPLE LIGHTING CO., LTD., Shanghai (CN)

(72) Inventor: Caishui Zhang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 19/079,725

(22) Filed: Mar. 14, 2025

(65) Prior Publication Data

US 2025/0207746 A1 Jun. 26, 2025

Related U.S. Application Data

(63) Continuation of application No. PCT/CN2023/117620, filed on Sep. 8, 2023.

(51) Int. Cl.

*F21S 4/28* (2016.01)
*F21V 19/00* (2006.01)
*F21Y 115/10* (2016.01)

(52) U.S. Cl.

CPC ............ *F21S 4/28* (2016.01); *F21V 19/0055* (2013.01); *F21Y 2115/10* (2016.08)

(58) Field of Classification Search

CPC ........ F21S 4/28; F21V 19/0055; F21V 15/00; F21V 23/00; F21Y 2115/10; F21Y 2103/10

See application file for complete search history.

(56) References Cited

U.S. PATENT DOCUMENTS

| | | | | |
|---|---|---|---|---|
| 9,651,225 B2 * | 5/2017 | Purdy | F21K 9/27 | |
| 10,830,397 B2 * | 11/2020 | Jiang | F21V 17/101 | |
| 2010/0142205 A1 * | 6/2010 | Bishop | F21V 23/06 | 362/249.02 |
| 2012/0008314 A1 * | 1/2012 | Simon | F21K 9/90 | 362/217.1 |
| 2012/0020088 A1 * | 1/2012 | Tamai | F21S 4/28 | 362/249.02 |

(Continued)

FOREIGN PATENT DOCUMENTS

| | | |
|---|---|---|
| CN | 206369102 U | 8/2017 |
| CN | 114110448 A | 3/2022 |
| CN | 218442176 U | 2/2023 |

OTHER PUBLICATIONS

International Search Report issued in PCT Application No. PCT/CN2023/117620 dated Nov. 11, 2023, (7p).

*Primary Examiner* — Evan P Dzierzynski
(74) *Attorney, Agent, or Firm* — Arch & Lake LLP

(57) ABSTRACT

The present disclosure provides a lighting fixture. The lighting fixture includes a light tube, a light source, a circuit board, and a stand. The light tube is provided with a guide rail used to clamp a substrate. The stand includes a first support bracket and a second support bracket that are opposite to each other, and a connection crossbeam. The first supporting bracket and the second supporting bracket are connected to two sides of the circuit board, and the connection crossbeam provides a support force to the first supporting bracket and the second supporting bracket.

11 Claims, 7 Drawing Sheets

(56) References Cited

U.S. PATENT DOCUMENTS

| | | | | |
|---|---|---|---|---|
| 2013/0094202 | A1* | 4/2013 | Wylie | F21V 21/0808<br>362/225 |
| 2017/0051882 | A1 | 2/2017 | Engel et al. | |
| 2019/0338897 | A1* | 11/2019 | Brown | F21K 9/272 |

* cited by examiner

LIGHTING FIXTURE

CROSS-REFERENCE TO RELATED APPLICATION(S)

This application is based upon and claims the priority of PCT patent application No. PCT/CN2023/117620 filed on Sep. 8, 2023 which claims priority to the Chinese patent application No. CN202222464140.7 filed on Sep. 16, 2022, the entire contents of which are hereby incorporated by reference herein for all purposes.

TECHNICAL FIELD

Examples of the present disclosure relates to the field of lighting technology, and in particular to a lighting fixture.

SUMMARY

The present disclosure provides a lighting fixture.

Accordingly, the present disclosure provides a lighting fixture that may include: a light tube, and the light tube that may include a cavity and a guide rail, and the guide rail may be located on the inner sidewall of the cavity, and the guide rail may extend along a length direction of the cavity;

A light source and a circuit board may be located in the cavity, the light source may be electrically connected to a circuit of the circuit board, and the circuit board may be installed in the guide rail along the length direction of the cavity; and a stand may include a first support bracket and a second support bracket that are opposite to each other;

A connection crossbeam may be included between the first support bracket and the second support bracket, the connection crossbeam may be connected to the first support bracket and the second support bracket, one end of the connection crossbeam may be connected to the first support bracket and the other end of the connection crossbeam may be connected to the second support bracket;

The first support bracket may be connected to one side of the circuit board and the second support bracket may be connected to the other side of the circuit board in a width direction of the circuit board.

It is to be understood that both the foregoing general description and the following detailed description are exemplary and explanatory only and are not restrictive of the present disclosure.

BRIEF DESCRIPTION OF DRAWINGS

In order to explain the technical solutions in the examples of the present disclosure more clearly, the drawings needed to be used in the description of the examples will be briefly introduced below. Obviously, the drawings in the following description are only some examples of the present disclosure. Those skilled in the art can also obtain other drawings based on these drawings without exerting creative efforts.

DETAILED DESCRIPTION

Figure 1:
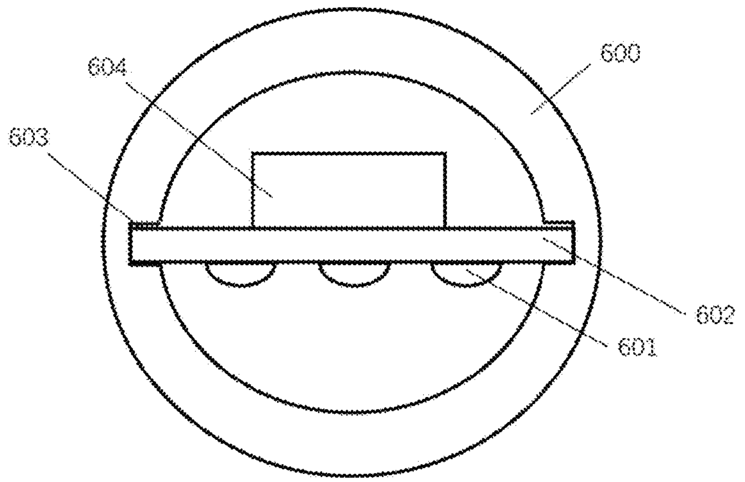
FIG. 1 is a schematic cross-sectional view of a lighting fixture.

The technical solutions in the examples of the present disclosure will be clearly and completely described below with reference to the accompanying drawings in the examples of the present disclosure. Obviously, the described examples are only some of the examples of the present disclosure, not all of the examples. Based on the examples of the present disclosure, all other examples obtained by those skilled in the art without creative efforts fall within the scope of protection of the present disclosure.

In the description of the present disclosure, it should be understood that the terms “center”, “upper”, “lower”, “front”, “rear”, “left”, “right”, “vertical”, “horizontal”, “top”, “bottom”, “inner”, “outer”, etc. (if any) indicate the orientation or positional relationship based on the orientation or positional relationship shown in the drawings, and are only for the convenience of describing the present disclosure and simplifying the description. It does not indicate or imply that the device or element referred to must have a specific orientation, be constructed and operated in a specific orientation, and therefore cannot be understood as a limitation on the present disclosure.

The terms “first” and “second” (if any) are used for descriptive purposes only and cannot be understood as indicating or implying relative importance or implicitly indicating the number of technical features indicated. Thus, features defined as “first” and “second” may expressly or implicitly include one or more such features. In the description of the present disclosure, unless otherwise stated, “plurality” means two or more.

In the description of the present disclosure, it should be noted that, unless otherwise clearly stated and limited, the terms “mount”, “connect” and “connection” (if any) should be understood in a broad sense. For example, it can be a fixed connection, it can also be a detachable connection or an integral connection; it can be a mechanical connection, a direct connection, or an indirect connection through an intermediate medium, or it can be an internal communication between two components. For those of ordinary skill in the art, the specific meanings of the above terms in the present disclosure can be understood on a specific basis.

Each technical feature of the present disclosure will be described in detail below. It should be noted that the description order of the following examples is not intended to limit the preferred order of the examples of the present disclosure. And in the following examples, the description of each example has its own emphasis. For parts that are not detailed in a certain example, please refer to the relevant descriptions of other examples. And the various examples can be arbitrarily combined to form new examples.

The main reference numerals in the drawings of the present disclosure description may be as follows:

Lighting fixture 100, light tube 200, cavity 201, guide rail 202, guide rail strip 203, groove 204, second bearing shoulder 205, first bearing shoulder 206, stand 300, first bearing boss 301, second bearing boss 302, first sub-boss 303, second sub-boss 304, first support bracket 310, first support column 311, first column 312, buckle 313, abutment piece 314, second support column 315, second column 316, plug 317, plug groove 318, connection part 320, first screw hole 321, screw seat 322, connection plate 323, retaining wall 324, clamping wire channel 325, anti-deformation groove 326, connection crossbeam 340, first hollow structure 341, reinforcement part 342, threading channel 343, central groove 344, second hollow structure 345, second support bracket 350, circuit board 400, substrate 401, electrical component 402, buckle hole 403, plug hole 404, second screw hole 405, one side 407, other side 408, central area 409, end cap 500, end groove 501, clamping member 502, clamping plate 503, limiting piece 504, lighting fixture 600, light source 601, printed circuit board 602, guide rail groove 603, electrical component 604.

As illustrated by FIG. 1, the light emission of a light source 601 in a lighting fixture 600 is controlled by a printed circuit board (PCB) 602, which generally extends along a length direction of the lighting fixture. For a lighting fixture with a relatively large length-to-diameter ratio, the PCB board needs to be well fixed in the lighting fixture 600 due to its relatively long length. If only a guide rail groove 603 inside the lighting fixture 600 is relied on to fix the PCB board along the length direction, then because there are many electrical components 604 on the PCB board and the weight is large, the two sides of the PCB board located in the guide rail groove 603 may be detached from the guide rail groove 603 under the action of gravity of the electrical components 604, or even falls into the lighting fixture 600, which will affect the light emitting effect of the lighting fixture 600 and reduce the service life of the lighting fixture 600.

As illustrated by FIGS. 2 to 5, the present example provides a lighting fixture 100, which includes: a light tube 200, a light source (not shown in the figure), a stand 300, a circuit board 400 and an end cap 500.

Figure 2:
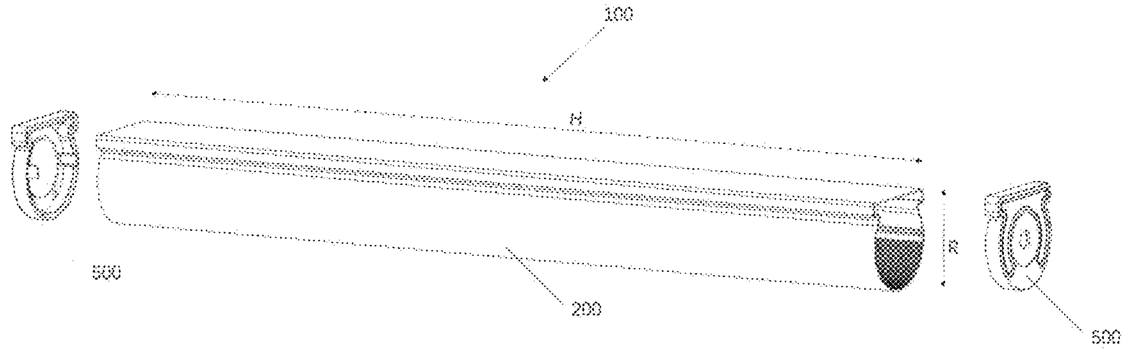
FIG. 2 is an exploded schematic diagram of a lighting fixture according to an example of the present disclosure.

The lighting fixture 100 may be a three-proof lighting fixture or a hollow tube lighting fixture. The lighting fixture 100 may have a length-to-diameter ratio greater than or equal to 3 or more. There is no particular limit on the upper limit of the length-to-diameter ratio. For example, the length-to-diameter ratio of the lighting fixture 100 may be in the range of 5 to 30, or in the range of 6 to 18. The length-to-diameter ratio can also be 10, 12, 15, 16, 17, 20, 22, 25, 27, etc. The length-to-diameter ratio is a ratio of the length to the width, thickness, or cross-sectional diameter of the lighting fixture. In FIG. 2, the length-to-diameter ratio is embodied as H/R.

The circuit board 400 is, for example, a PCB board or the like.

The light source can be an LED lighting fixture bead or an LED lighting fixture strip, or the light source can also be a powdery luminescent material or a powdery reflective material such as phosphor or phosphorescent powder, which is evenly applied to the inner surface of the cavity 201. When the light source is an LED strip, the light source extends along the length direction of the cavity 201. It should be understood that the type of light source is not particularly limited, as long as it can be placed in the cavity 201.

Figure 5:
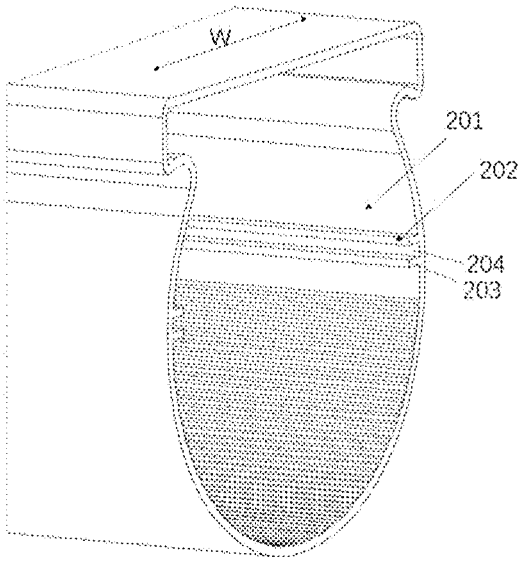
FIG. 5 is an enlarged view of the end of a light tube according to an example of the present disclosure.

As illustrated by FIG. 5, the light tube 200 includes a hollow cavity 201 and guide rails 202, and the circuit board 400 is accommodated by the guide rails 202 on two sides of the cavity 201 along the width direction (the W direction shown in FIG. 5).

The guide rail 202 is located on the inner sidewall of the cavity 201 and extends along the length direction of the cavity 201 (the H direction shown in FIG. 2).

Specifically, at least two guide rails 202 are located in pairs on the inner sidewall, and each guide rail 202 includes two guide rail strips 203 arranged in parallel, and the two guide rail strips 203 form a groove 204 for receiving and fixing the sides of the circuit board 400, and the grooves 204 of the pair of guide rails 202 are arranged opposite to each other. Specifically, opposing grooves 204 are at the same height and have opposite opening directions.

The light source and the circuit board 400 are arranged in the cavity 201, the light source is electrically connected to a circuit of the circuit board 400, and the circuit board 400 is mounted in the guide rail 202 along the length direction of the cavity 201.

The light source and the circuit board 400 can be provided integrally or separately. When the light source and the circuit board 400 are integrally provided, the light source and the circuit board 400 are combined into an integral component. In other examples, the lighting fixture may also include an external circuit board connected to a power supply.

The circuit board 400 includes a substrate 401 and an electrical component 402 located on substrate 401.

The electrical component 402 is electrically connected to the light source. Specifically, the electrical component 402 includes but is not limited to a control circuit, and the control circuit is used to control the lighting condition of the light source, for example, the on or off of the light source, the lighting intensity of the light source, the lighting time, etc.

Figure 3:
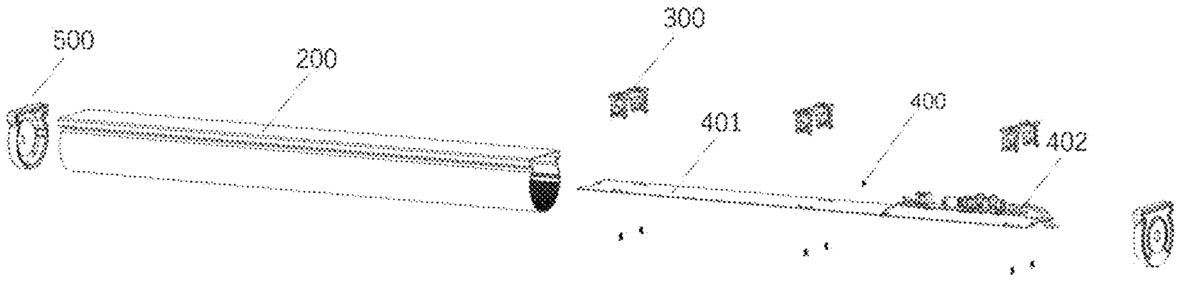
FIG. 3 is a schematic three-dimensional structural diagram of a light tube and an end cap according to an example of the present disclosure.
Figure 4:
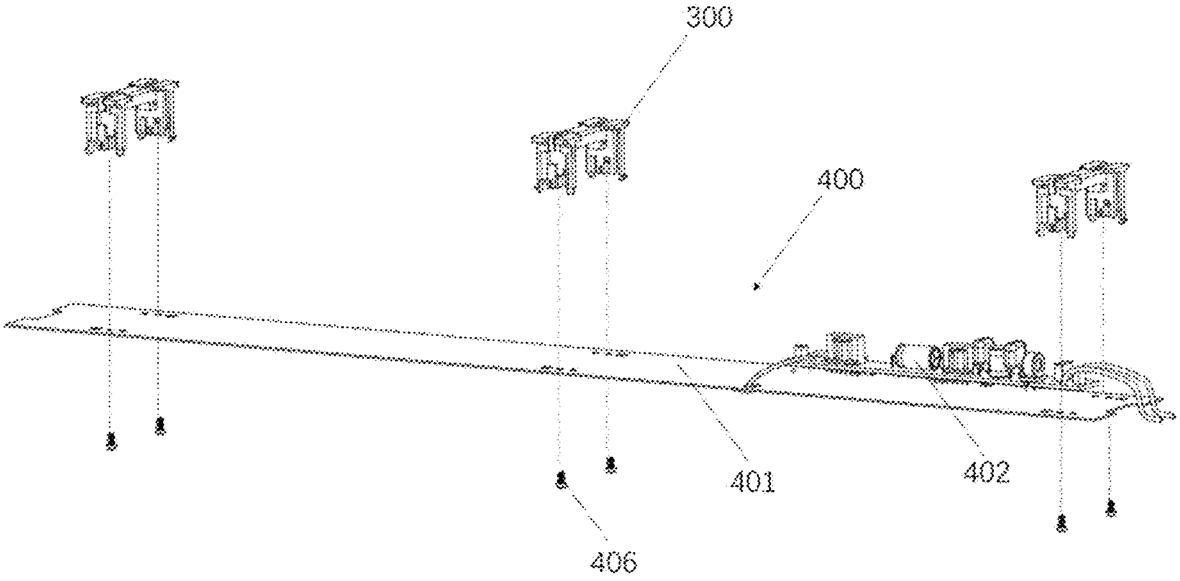
FIG. 4 is a schematic three-dimensional structural diagram of a circuit board and a stand according to an example of the present disclosure.

The substrate 401 carries or supports the electrical component 402, that is, the electrical component 402 can be located on the upper surface of the substrate 401 or on the lower surface of the substrate 401 ("upper" and "lower" here are relative to FIGS. 3 and 4 (in terms of the up and down direction). The substrate 401 extends along the length direction of the cavity 201 and is mounted on the guide rail 202. Therefore, the two sides of the substrate 401 along its width direction are respectively embedded in the grooves 204 of the two opposite guide rails 202, so that two sides of the substrate 401 are clamped by the groove 204 to prevent the substrate 401 from detaching from the groove 204.

In the present example, the length of the substrate 401 is much greater than its width. For example, the ratio of the length to the width of the substrate 401 (i.e., the length-to-diameter ratio) can be compared with the value of the length-to-diameter ratio of the lighting fixture 100.

In the present example, the width of the substrate 401 is also much larger than the depth of the groove 204. For example, the width of the substrate 401 is 8 to 12 times the depth of the groove 204, and may also be 9 times, 10 times, 11 times, etc.

On the one hand, the width of the substrate 401 is much larger than the depth of the groove 204. Therefore, the groove 204 can only give support force to two sides of the substrate 401 along its width direction. On the other hand, the central part of the substrate 401 will be provided with the electrical component 402 of a certain weight. Therefore, the electrical component 402 will press the central part of the substrate 401 downward under the action of its gravity. As a result, two sides of the substrate 401 along its width direction can easily detach from the constraints of the groove 204 and sink, causing the circuit board 400 to easily fall off from the groove 204 and fall into the cavity 201.

In the present example, the stand 300 is used to reinforce two sides of the substrate 401 along the width direction.

As illustrated by FIGS. 3 and 4, the stand 300 is arranged along the width direction of the substrate 401 and connect two sides of the substrate 401 along the width direction to form an overall force-bearing structure. The overall force-bearing structure strengthens the structural strength of the substrate 401 along its width direction, and therefore can reduce the downforce of the electrical component 402 at the center part of the substrate 401 on two sides of the substrate 401 along its width direction, thereby reducing the risk of deformation of the substrate 401 under the action of the downforce, thereby reducing the risk of the substrate 401 falling off from the groove 204.

The stand 300 can be located above the substrate 401 or below the substrate 401, and the specific arrangement varies according to the arrangement of the light source. For example, if the light source is coated on the inner sidewall of the cavity 201, the stand 300 may be located above or below the substrate 401. If the light source is located below the substrate 401, the stand 300 can be located above the substrate 401 to avoid blocking the light emitted by the light source. The number of stand 300 may be one or more. If the number is multiple, a plurality of stands 300 may be arranged at intervals (i.e., spaced apart) along the length of the substrate 401. The plurality of stands 300 can be arranged at equal intervals or at unequal intervals. For example, more stands 300 can be provided in the area of the substrate 401 where the electrical components 402 are provided, and fewer stands 300 can be provided in the area of the substrate 401 where the electrical components 402 are not provided, that is, the density of stands 300 provided in the area of the substrate 401 where the electrical components 402 are provided is greater than the density of the area of the substrate 401 where the electrical components 402 are not provided.

Figure 6:
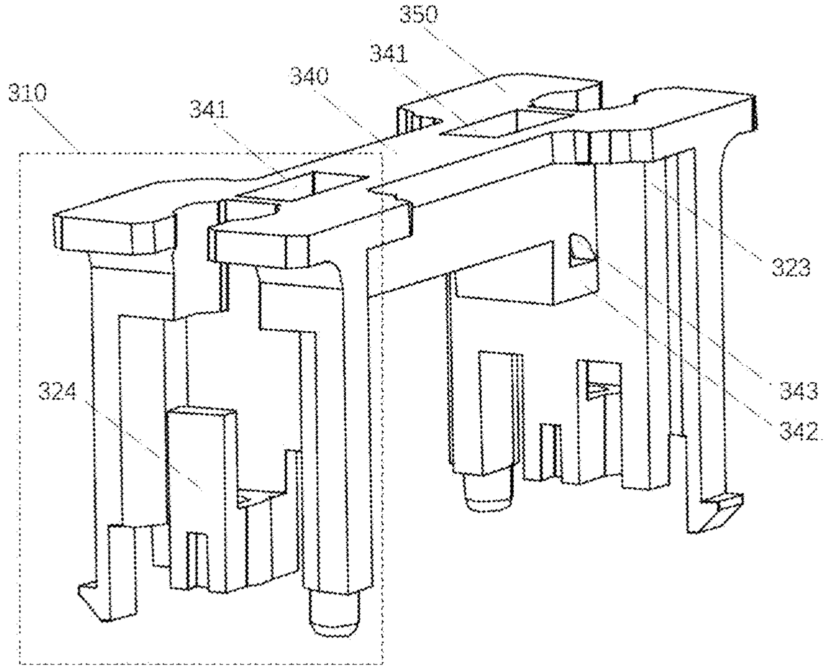
FIG. 6 is a schematic three-dimensional structural diagram of a stand from a first perspective according to an example of the present disclosure.

As illustrated by FIG. 6, the stand 300 includes a first support bracket 310 (shown in dashed lines in FIG. 6) and a second support bracket 350 opposite to each other, and a connection crossbeam 340 connected to the first support bracket 310 and the second support bracket 350 respectively.

The connection crossbeam 340 is located between the first support bracket 310 and the second support bracket 350. One end of the connection crossbeam 340 is connected to the first support bracket 310, the other end of the connection crossbeam 340 is connected to the second support bracket 350, and in the width direction of the circuit board 400, the first support bracket 310 is connected to one side of the circuit board 400, and the second support bracket 350 is connected to the other side of the circuit board 400.

The stand 300 may be a rigid structure as a whole, but it is not excluded that some parts may be an elastic structure. When the main body parts of the first support bracket 310, the second support bracket 350 and the connection crossbeam 340 are rigid structures, the strength of the substrate 401 can be enhanced.

In the present example, as illustrated by FIG. 6, the upper surface of the connection crossbeam 340 includes a first hollow structure 341. The first hollow structure 341 is used to allow the user to observe the circuit board 400 and light source below it, or to facilitate viewing of the installation situation during installation.

The lower surface of the connection crossbeam 340 close to the second support bracket 350 is provided with a reinforcement part 342, and two adjacent sidewalls of the reinforcement part 342 are respectively connected to the lower surface of the connection crossbeam 340 and the sidewall of the second support bracket 350, so as to reinforce the structure of the connection crossbeam 340 and the second support bracket 350.

The reinforcement part 342 may be integrally formed with the connection crossbeam 340 and the second support bracket 350 by injection molding.

The reinforcement part 342 is provided with a threading channel 343, and the threading channel 343 allows wires for connecting the electrical component 402 to pass through in order to save installation space.

Figure 7:
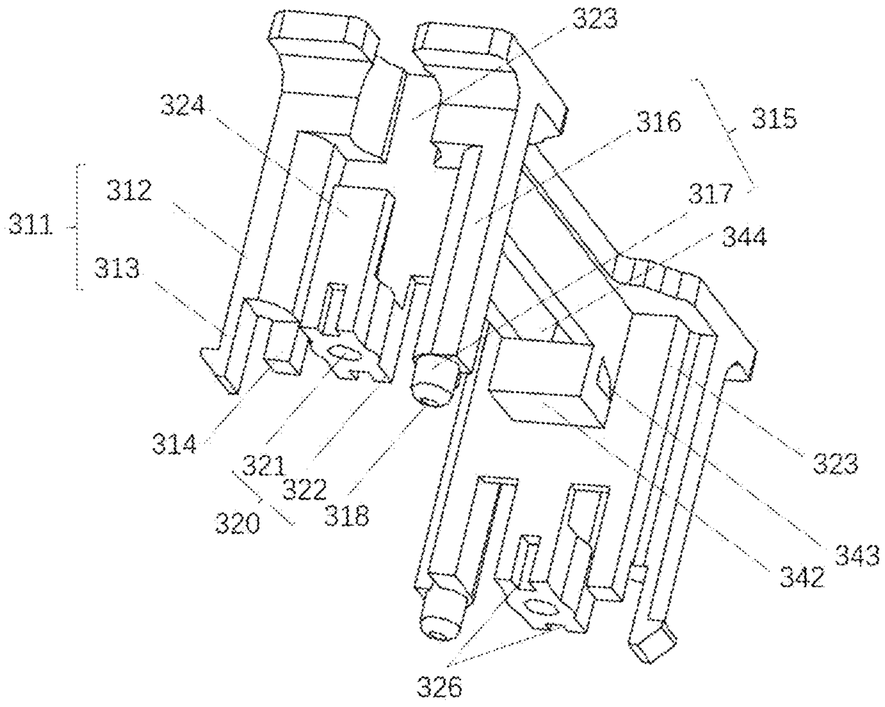
FIG. 7 is a schematic three-dimensional structural diagram of a stand from a second perspective according to an example of the present disclosure.

As illustrated by FIG. 7, the lower surface of the connection crossbeam 340 includes a central groove 344, the central groove 344 extends along the length of the connection crossbeam 340 from the first support bracket 310 to the second support bracket 350.

The central groove 344 may be used to accommodate electrical wiring, and in addition, the central groove 344 may reduce the overall weight of the stand 300 and facilitate the molding of the stand 300 after injection molding.

As illustrated by FIG. 6, the first support bracket 310 includes: a first support column 311 and a second support column 315 respectively located on two sides of the connection crossbeam 340, and a connection part 320 respectively connected to the first support column 311 and the second support column 315.

In the width direction of the circuit board 400, one end of one or both of the first support column 311 and the second support column 315 is connected to one side of the circuit board 400.

The first support column 311 includes a first column 312 and a buckle 313 located at one end of the first column 312.

Figure 8:
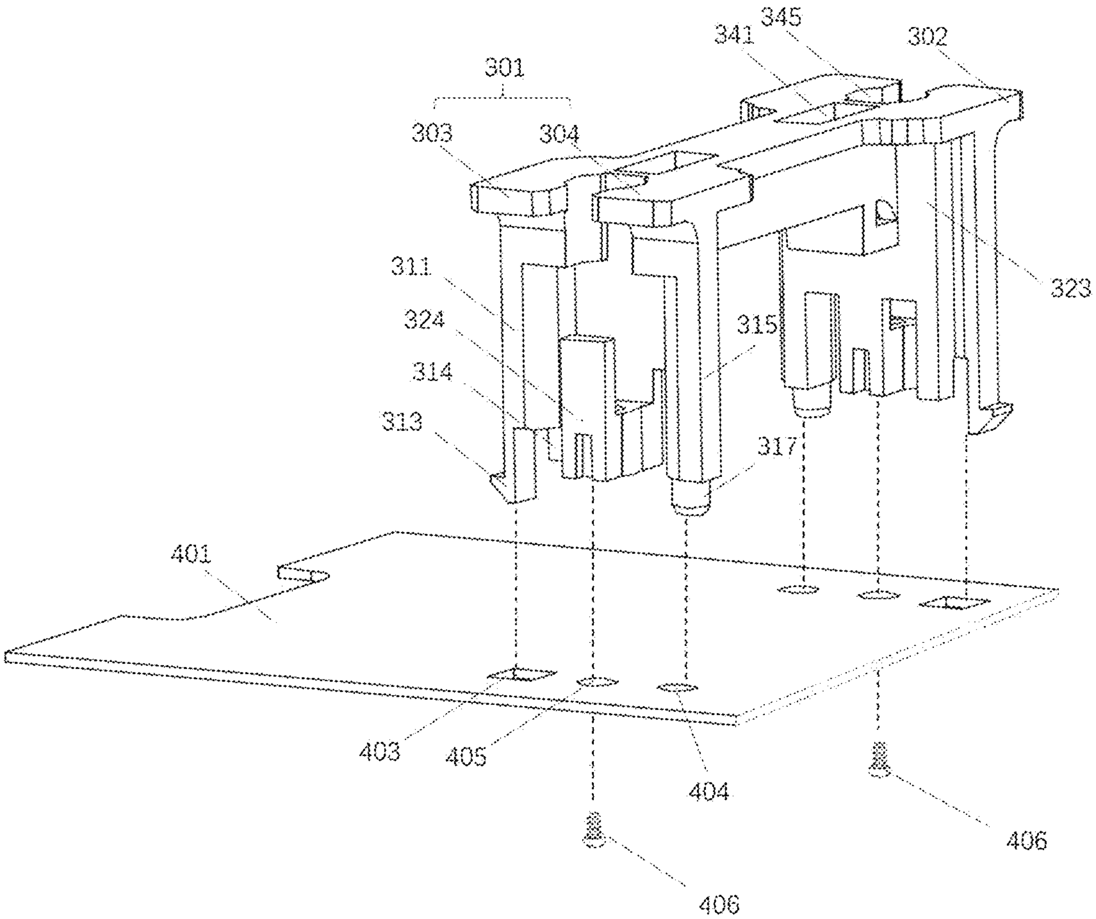
FIG. 8 is a schematic three-dimensional assembly diagram between a stand and a substrate in an example of the present disclosure.

As illustrated by FIGS. 7 and 8, a buckle hole 403 is opened on the substrate 401 of the circuit board 400.

The buckle 313 has a certain elasticity and can pass through the buckle hole 403 and engage and connect with the buckle hole 403 to form a buckle structure. When the buckle 313 passes through the buckle hole 403, a bent portion of the buckle 313 elastically recovers and blocks the buckle hole 403, thereby preventing the buckle 313 from detaching from the buckle hole 403. The shape of the buckle hole 403 can be square, rectangular, circular, semicircular, etc., as long as the above-mentioned engaging function can be achieved.

The second support column 315 includes a second column 316 and a plug 317 located at one end of the second column 316.

A plug hole 404 is provided on the substrate 401 of the circuit board 400, and the plug 317 passes through the plug hole 404 and is connected to the plug hole 404 with an interference fit.

In the present example, the plug 317 has a certain degree of contractility. When the plug 317 passes through the plug hole 404, the plug 317 can interfere with the plug hole 404, thereby preventing the plug 317 from falling off the plug hole 404.

In other examples, the plug 317 is a rigid structure, and when the plug 317 passes through the plug hole 404, the plug 317 can enlarge the plug hole 404, thereby achieving a tight-fitting connection with the plug hole 404.

In the present example, the plug 317 includes a plug groove 318 opening towards the plug hole 404. The plug 317 containing the plug groove 318 has a certain elastic contractility, making it easier to achieve an interference fit.

In other examples, the first column 312 of the first support column 311 may be aligned parallel to the second column 316 of the second support column 315.

Because the first support column 311 is connected to the circuit board 400 through a buckle structure, and the second support column 315 is connected to the circuit board 400 through an interference fit through a plug structure, the first support bracket 310 adopts two different structures respectively to connected with the circuit board 400, so that when the stand 300 is mounted on the circuit board 400, the stand 300 can be prevented from being installed upside down to achieve a fool-proof function.

The connection part 320 is located between the first support column 311 and the second support column 315 and connects the first support column 311 and the second support column 315 together.

The connection part 320 includes a first screw hole 321 opening towards the circuit board 400, and a second screw hole 405 is correspondingly opened on the substrate 401 of the circuit board 400.

As illustrated by FIG. 8, the screw 406 passes through the second screw hole 405 and the first screw hole 321 in sequence and is bolted to the connection part 320.

Figure 9:
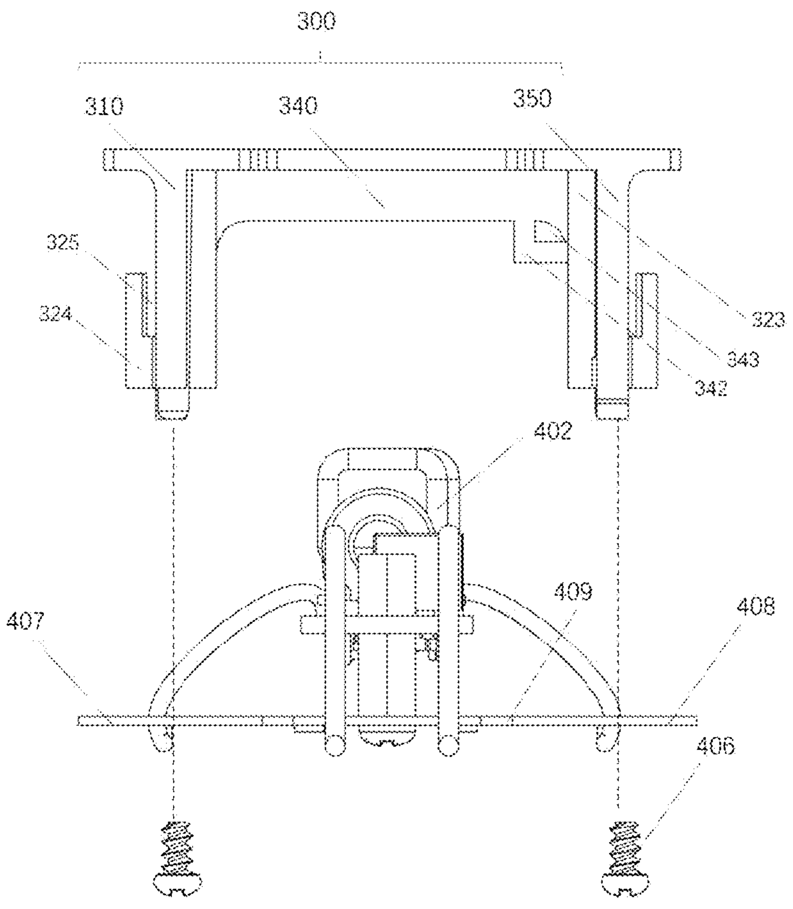
FIG. 9 is a schematic side view assembly diagram of a support and a circuit board in one example of the present disclosure.
Figure 10:
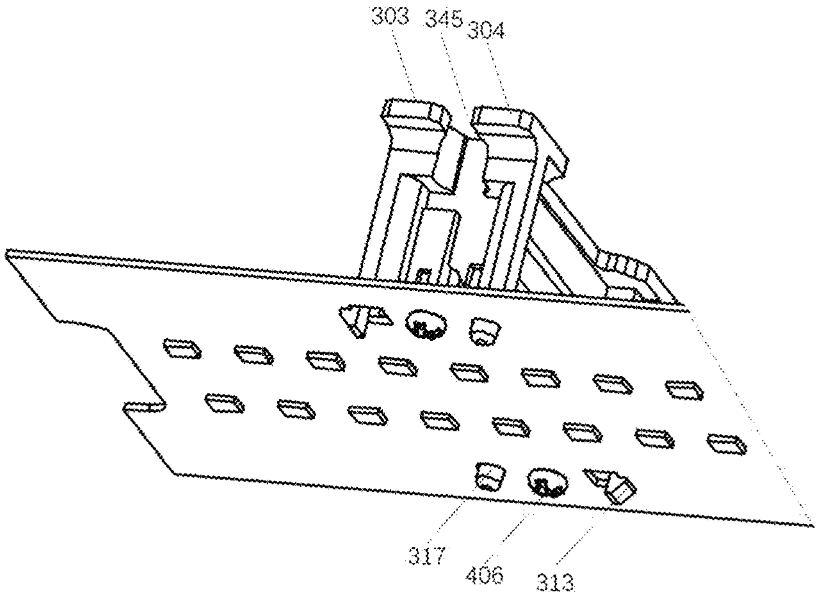
FIG. 10 is a schematic assembly diagram of a support and a circuit board in an example of the present disclosure.

As illustrated by FIGS. 8 to 10, the first support column 311 is connected to the circuit board 400 through a buckle structure, the second support column 315 is connected to the circuit board 400 with an interference fit through a plug structure, and the connection part 320 is connected to the circuit board 400 through screws 406, and the three connection points are arranged in sequence along the length direction of the circuit board 400. Therefore, the stand 300 is connected to the circuit board 400 through three different structures, which can enhance the connection strength and reduce the risk of deformation of the circuit board 400.

The connection part 320 includes a connection plate 323 and a screw seat 322.

The two sides of the connection plate 323 are connected to the first support column 311 and the second support column 315 respectively, and the bottom of the connection plate 323 is connected to the screw seat 322. The first screw hole 321 is located in the screw seat 322 and opens towards the circuit board 400.

The first screw hole 321 of the screw seat 322 may or may not be provided with threads. If no threads are provided, screw 406 may be a self-tapping screw.

As illustrated by FIG. 9, the connection part 320 further includes a retaining wall 324. The retaining wall 324 is arranged parallel to the connection plate 323 and includes a distance from the connection plate 323, so that the retaining wall 324, the screw seat 322 and the connection plate 323 form a clamping wire channel 325 therebetween, and the clamping wire channel 325 allows the passage of various wires and restricts the displacement of the wires.

In addition, the two opposite sides of the screw seat 322 have corresponding anti-deformation grooves 326. The anti-deformation groove 326 extends along the sidewall of the screw seat 322, and the extension direction is parallel to the extension direction of the first column 312 and the extension direction of the second column 316.

The anti-deformation groove 326 reduces the weight of the screw seat 322 and reduces the risk of shrinkage deformation of the screw seat 322 due to excessive thickness.

The first support column 311 also includes an abutment piece 314.

The abutment piece 314 and the buckle 313 are located at different positions at the same end of the first column 312.

Specifically, the bottom surface of the abutment piece 314, the bottom surface of the screw seat 322, and the bottom surface of the second column 316 are located in the same plane to simultaneously achieve surface contact with the circuit board 400. This surface contact is a smaller surface contact, which is conducive to achieving stable contact between the stand 300 and the circuit board 400, reduces the risk of deformation due to poor contact when the entire surface is in contact or a large area is in contact, and also reduces the risk of deformation due to poor contact when the entire surface is in contact with a large area. Defects in uneven force.

In the present example, the second support bracket 350 is a centrally symmetrical structure with the first support bracket 310.

As illustrated by FIG. 8, the buckle of the first support bracket 310 is located on the left side in FIG. 8, the plug of the first support bracket 310 is located on the right side in FIG. 8, the buckle of the second support bracket 350 corresponding to the first support bracket 310 is located on the right side in FIG. 8, and the plug of the second support bracket 350 is located on the left side in FIG. 8, that is, the connection line between the buckle of the first support bracket 310 and the buckle of the second support bracket 350, and the connection line between the plug of the first support bracket 310 and the plug of the second support bracket 350 are in a cross relationship.

For the detailed structure of the second support bracket 350, please refer to the above description of the structure of the first support bracket 310, and will not be described again here.

In other examples, the second support bracket 350 is a mirror-symmetrical structure to the first support bracket 310. Specifically, the structure of the second support bracket 350 is mirror symmetrical with the first support bracket 310 in specific settings, and the connection line between the buckle of the first support bracket 310 and the buckle of the second support bracket 350, the connection line between the plug of the first support bracket 310 and the plug of the second support bracket 350 are in a parallel relationship.

Figure 11:
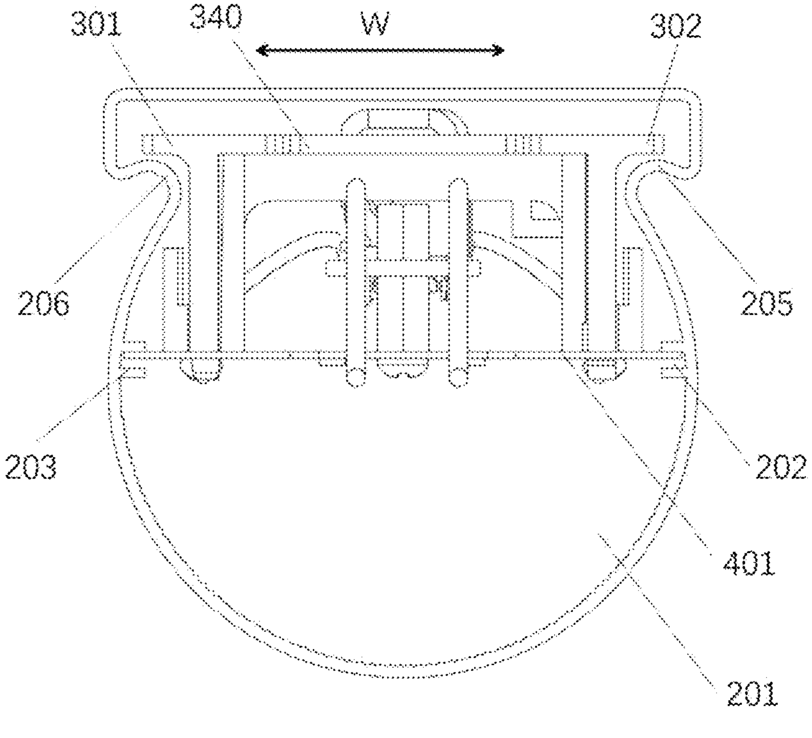
FIG. 11 is a schematic front assembly diagram of a support and a circuit board in one example of the present disclosure.

As illustrated by FIGS. 9 to 11, the first support bracket 310, the second support bracket 350 and the connection crossbeam 340 form an accommodation space with a door-frame structure, and the accommodation space is used to accommodate the electrical component 402 provided on the substrate 401.

By installing the stand 300 having a door-frame accommodation space in the area on the substrate 401 where the electrical component 402 is provided, the installation of the stand 300 can be prevented from being affected by the space occupied by the electrical component 402.

Specifically, the stand 300 extends from one side 407 of the substrate 401 along its width direction to the other side 408. Through the connection between the stand 300 and two sides of the substrate 401, the substrate 401 and the stand 300 form an overall force-bearing structure. This overall force-bearing structure reduces the deformation of the substrate 401 due to the gravity of the electrical component 402 and strengthens the structural strength of the substrate 401. Therefore, when the gravity of the electrical component 402 acts on the central area 409 of the substrate 401, the risk of deformation of the substrate 401 can be avoided, thereby avoiding the risk of two sides of the substrate 401 falling off the groove 204 of the guide rail 202.

As illustrated by FIG. 11, the inner sidewall of the light tube 200 includes a first bearing shoulder 206 and a second bearing shoulder 205 that face and correspond to each other, and the first bearing shoulder 206 and the second bearing shoulder 205 are formed by the inward depression of the inner sidewall of the light tube 200.

In other examples, the first bearing shoulder 206 and the second bearing shoulder 205 may not be formed by bending the inner sidewall of the light tube 200, but may be directly provided on the inner sidewall of the light tube 200 as a boss protruding towards the inside of the cavity 201.

In the present example, the stand 300 further includes a first bearing boss 301 and a second bearing boss 302 to cooperate with the first bearing shoulder 206 and the second bearing shoulder 205.

Specifically, the first bearing boss 301 and the second bearing boss extend away from the connection crossbeam 340 (see the W direction in FIG. 11). The first bearing boss 301 is mounted on the first bearing shoulder 206, and the second bearing boss 302 is mounted on the second bearing shoulder 205. For ease of understanding, FIG. 9 shows the state in which the substrate 401 and the stand 300 are ready to be assembled in the cavity 201, rather than the state already installed. FIG. 11 shows the assembled state. At this time, the first bearing boss 301 abuts against the first bearing shoulder 206, the second bearing boss 302 abuts against the second bearing shoulder 205, and the substrate 401 is mounted on the lower guide rail strip 203 of the guide rail 202. Thereby, the first bearing shoulder 206 and the second bearing shoulder 205 share the gravity of the electrical component 402 on the substrate 401, reducing the risk of deformation of the substrate 401 caused by the gravity of the electrical component 402, thereby preventing the substrate 401 from falling off the guide rail 202.

In other examples, the thickness of the substrate 401 can be greater than the width of the groove 204 of the guide rail 202. Therefore, the substrate 401 and the groove 204 can be in an interference fit, and the friction force generated by the interference fit can also partially offset the pressure caused by the electrical component 402 on the central area 409 of the substrate 401, thereby preventing the risk of two sides of the substrate 401 falling off the groove 204 to a certain extent.

As illustrated by FIGS. 8 to 11, the first bearing boss 301 includes a first sub-boss 303 and a second sub-boss 304.

In the extension direction of the connection crossbeam 340, one end of the first sub-boss 303 abuts against the first bearing shoulder 206, and the other end of the first sub-boss 303 is connected to the first support column 311. In the extension direction of the connection crossbeam 340, one end of the second sub-boss 304 abuts against the first bearing shoulder 206, and the other end of the second sub-boss 304 is connected to the second support column 315. There is a second hollow structure 345 between the first sub-boss 303 and the second sub-boss 304, so that the first sub-boss 303 and the second sub-boss 304 have a distance.

The second hollow structure 345 facilitates viewing of the installation situation during installation, allows wires to pass through after installation, and can also reduce the overall weight of the stand 300, reduce the strength of the stand 300, and increase its elastic deformability during use.

Preferably, the second bearing boss 302 is a structure that is mirror symmetrical or centrally symmetrical with the first bearing boss 301.

In addition, the first bearing boss 301 is mounted on the first bearing shoulder 206, the second bearing boss 302 is mounted on the second bearing shoulder 205, and the substrate 401 is mounted on the lower guide rail strip 203 of the guide rail 202 or is interference-fitted into the guide rail 202. In this way, a mouth-shaped structure can be formed as a whole.

In this mouth-shaped structure, the gravity of the electrical component 402 will be partially shared on the first bearing shoulder 206 and the second bearing shoulder 205, and will also be partially shared on the guide rail 202. Therefore, the force in the middle part of the substrate 401 will be less than the gravity of the electrical component 402, thereby reducing the component of gravity on the guide rail 202, thereby reducing the risk of two sides of the substrate 401 falling off the guide rail 202, and effectively preventing the substrate 401 from falling into the cavity 201.

Figure 12:
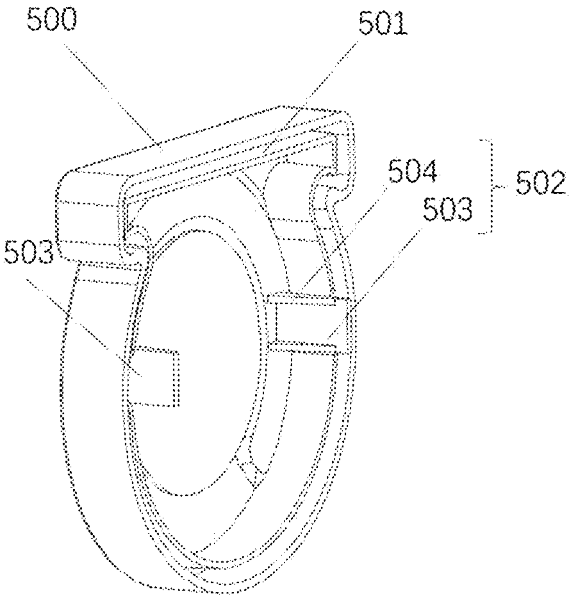
FIG. 12 is a schematic structural diagram of an end cap in an example of the present disclosure.

As illustrated by FIGS. 2, 3 and 12, the lighting fixture 100 further includes two end caps 500 that are respectively snap-fitted with two ends of the cavity 201. It should be noted that FIG. 12 only shows the structure of one end cap 500, and the structure of the other end cap 500 is the same or mirror image.

The end cap 500 includes an end groove 501 opening towards the light tube 200. The circumferential shape of the end groove 501 corresponds to the cross-sectional shape of the cavity 201 of the light tube 200, so that the two ends of the cavity 201 are respectively accommodated in the corresponding end grooves 501 of the end cap 500, so as to seal the inside of cavity 201.

The end cap 500 also includes two clamping members 502 arranged opposite to each other in the circumferential direction of the end cap 500, and the clamping members 502 are located on the end surface of the end cap 500 facing the light tube 200.

Preferably, the two clamping members 502 may be symmetrically disposed in the end cap 500.

Specifically, the clamping member 502 includes: a clamping plate 503 and two limiting pieces 504 located on two sides of the clamping plate 503 in the length direction of the cavity 201.

The clamping plate 503 and the two limiting pieces 504 will form a clamping groove.

The clamping groove extends in the same direction as the length direction of the substrate 401. In addition, the clamping groove corresponds to the position and opening direction of the groove 204 defined by the guide rail 202 in the cavity 201, for placing and clamping both side ends of the substrate 401 along its length direction.

The clamping plate 503 constitutes the bottom of the clamping groove, and the two limiting pieces 504 respectively constitute the two sidewalls of the clamping groove. The two limiting pieces 504 are used to limit the moving distance of the substrate 401 in its thickness direction. The clamping plates 503 have a certain degree of deformability. After the end of the substrate 401 along its length direction enters the clamping groove, the two opposite clamping plates 503 clamp the end of the substrate 401, so that the substrate 401 cannot move towards its length direction, nor towards its width and thickness direction. At the same time, the clamping force of the clamping plates 503 can also share a part of the gravity of the electrical component 402, thereby preventing the substrate 401 from detaching from the groove 204. It plays an auxiliary function of preventing falling off.

Preferably, the clamping plate 503 extends out of the end cap 500 to increase the contact area between the clamping plate 503 and the circuit board 400, improve the fastening strength of the circuit board 400, and prevent the circuit board 400 from being displaced in the cavity 201.

In summary, in the lighting fixture 100 of the technical solution of the present disclosure, because the inner sidewall of the cavity 201 of the lighting fixture 100 is provided with a guide rail 202 extending along the length direction of the cavity 201, and the stand 300 is arranged along the width direction of the circuit board 400, and in the width direction of the circuit board 400, the first support bracket 310 is connected to one side of the circuit board 400 and the second support bracket 350 is connected to the other side of the circuit board 400. Therefore, the guide rail 202 is pinched or supported on two sides of the circuit board 400 in the width direction, the stand 300 strengthens the strength of the circuit board 400 in its width direction, so that the circuit board 400 is not easily deformed during use, thereby reducing or preventing the risk of two sides of the circuit board 400 detaching from the guide rail 202 in the width direction.

The object of the present disclosure is to provide a lighting fixture to solve the problem that the circuit board in the lighting fixture is easily detached from the guide rail groove.

In order to solve the above technical problems, the technical solution of the present disclosure provides a lighting fixture, including: a light tube, the light tube includes a cavity and a guide rail, the guide rail is located on the inner sidewall of the cavity, and the guide rail extends along a length direction of the cavity; a light source and a circuit board located in the cavity, the light source being electrically connected to a circuit of the circuit board, and the circuit board being installed in the guide rail along the length direction of the cavity; and a stand including a first support bracket and a second support bracket that are opposite to each other, and a connection crossbeam between the first support bracket and the second support bracket, the connection crossbeam being connected to the first support bracket and the second support bracket respectively, one end of the connection crossbeam being connected to the first support bracket and the other end of the connection crossbeam being connected to the second support bracket, the first support bracket being connected to one side of the circuit board and the second support bracket being connected to the other side of the circuit board in a width direction of the circuit board.

Optionally, the first support bracket includes a first support column, a second support column respectively located on two sides of the connection crossbeam, and a connection part respectively connected to the first support column and the second support column, and, in the width direction of the circuit board, one end of one or both of the first support column and the second support column is connected to one side of the circuit board.

Optionally, the first support column includes a first column and a buckle located at one end of the first column, and the circuit board includes a corresponding buckle hole, and the buckle passes through the buckle hole and is snap-fitted with the buckle hole.

Optionally, the second support column includes a second column and a plug located at one end of the second column, the circuit board includes a corresponding plug hole, and the plug passes through the plug hole and is connected to the plug hole with an interference fit.

Optionally, the connection part includes a first screw hole with an opening towards the circuit board, and the circuit board includes a second screw hole corresponding to the first screw hole, and the lighting fixture further includes a screw, and the screw passes through the second screw hole and the first screw hole in sequence, and is bolted to the connection part.

Optionally, the cavity includes a first bearing shoulder and a second bearing shoulder being inwardly concave and facing each other; the stand also includes: a first bearing boss connected to the first support bracket, and a second bearing boss connected to the second support bracket, the first bearing boss and the second bearing boss extend away from the connection crossbeam, the first bearing boss is mounted on the first bearing shoulder, and the second bearing boss is mounted on the second bearing shoulder.

Optionally, the first bearing boss includes a first sub-boss and a second sub-boss, and, in an extension direction of the connection crossbeam, one end of the first sub-boss abuts against the first bearing shoulder, the other end of the first sub-boss is connected to the first support column, one end of the second sub-boss abuts against the first bearing shoulder, and the other end of the second sub-boss is connected to the second support column; the second bearing boss is a structure with mirror symmetry or central symmetry with the first bearing boss.

Optionally, the second support bracket is a structure with mirror symmetry or central symmetry with the first support bracket.

Optionally, the circuit board includes a substrate and an electrical component located on the substrate, and the first support bracket, the second support bracket and the connection crossbeam form an accommodation space with a door-frame structure, and the accommodation space accommodates the electrical component located on the substrate.

Optionally, the lighting fixture also includes two end caps respectively snap-fitted with two ends of the cavity, each end cap of the end caps includes an end groove opening towards the light tube, an end of the cavity protrudes into the end groove, and end cap of the end caps also includes two clamping members opposite in a circumferential direction of the end cap, each of the clamping members includes a clamping plate and two limiting pieces located on two sides of the clamping plate in the length direction of the cavity, and an end of the circuit board in the length direction of the cavity are inserted into a clamping groove formed by the clamping plate and the two limiting pieces to achieve the clamping function of the two ends of the circuit board.

In the lighting fixture provided by the technical solution of the present disclosure, because the inner sidewall of the cavity of the lighting fixture is provided with a guide rail extending along the length direction of the cavity, and the stand is arranged along the width direction of the circuit board, and in the width direction of the circuit board, one side of the circuit board is connected by the first support bracket, and the other side of the circuit board is connected by the second support bracket. Therefore, on the basis of clamping or supporting two sides of the circuit board in the width direction by the guide rail, the strength of the circuit board in its width direction is strengthened by the stand, so that the circuit board is less likely to deform during use, thereby reducing or preventing the risk of two sides of the circuit board in the width direction from detaching from the guide rail.

The above are only examples of the present disclosure, but the protection scope of the present disclosure is not limited thereto. Any person familiar with the technical field can easily think of changes or substitutions within the technical scope disclosed in the present disclosure. It should be covered by the protection scope of the present disclosure. In addition, specific examples are used in the description to illustrate the principles and implementation modes of the present disclosure. The descriptions of the above examples are only used to help understand the method and core ideas of the present disclosure, and the content of this description should not be construed as limiting the present disclosure.

The invention claimed is:

1. A lighting fixture, comprising:

a light tube comprising a cavity and a guide rail located on an inner sidewall of the cavity, the guide rail extending along a length direction of the cavity;

a light source and a circuit board located within the cavity, the light source being electrically connected to a circuit of the circuit board, the circuit board being mounted in the guide rail along a length direction of the cavity; and a stand comprising a first support bracket and a second support bracket that are opposite to each other, and a connection crossbeam between the first support bracket and the second support bracket, one end of the connection crossbeam being connected to the first support bracket and other end of the connection crossbeam being connected to the second support bracket, and wherein the first supporting bracket is connected to one side of the circuit board and the second supporting bracket is connected to other side of the circuit board in a width direction of the circuit board.

2. The lighting fixture according to claim 1, wherein the first support bracket comprises:

a first support column and a second support column located on two sides of the connection crossbeam, and a connection part connected to the first support column and the second support column, and, in the width direction of the circuit board, one end of one or both of the first support column and the second support column is connected to one side of the circuit board.

3. The lighting fixture according to claim 2, wherein:

the first support column comprises a first column and a buckle located at one end of the first column, and the circuit board comprises a corresponding buckle hole, and the buckle is snap-fitted with the buckle hole.

4. The lighting fixture according to claim 3, wherein:

the second support column comprises a second column and a plug located at one end of the second column, and the circuit board comprises a corresponding plug hole, and the plug is connected to the plug hole with an interference fit.

5. The lighting fixture according to claim 2, wherein:

the second support column comprises a second column and a plug located at one end of the second column, and the circuit board comprises a corresponding plug hole, and the plug is connected to the plug hole with an interference fit.

6. The lighting fixture according to claim 2, wherein:

the connection part comprises a first screw hole with an opening towards the circuit board, and the circuit board comprises a second screw hole corresponding to the first screw hole, the lighting fixture further comprising a screw, and the screw passes through the second screw hole and the first screw hole in sequence and is bolted to the connection part.

7. The lighting fixture according to claim 2, wherein the cavity comprises a first bearing shoulder and a second bearing shoulder being inwardly concave and facing each other; and the stand further comprises a first bearing boss connected to the first support bracket and a second bearing boss connected to the second support bracket, the first bearing boss and the second bearing boss extending away from the connection crossbeam, the first bearing boss is mounted on the first bearing shoulder, the second bearing boss is mounted on the second bearing shoulder.

8. The lighting fixture according to claim 7, wherein:

the first bearing boss comprises a first sub-boss and a second sub-boss, and, in an extension direction of the connection crossbeam, one end of the first sub-boss abuts against the first bearing shoulder, and the other end of the first sub-boss is connected to the first support column, one end of the second sub-boss abuts against the first bearing shoulder and the other end of the second sub-boss is connected to the second support column; and the second bearing boss is a structure with mirror symmetry or central symmetry with the first bearing boss.

9. The lighting fixture according to claim 1, wherein the second support bracket is a structure with mirror symmetry or central symmetry with the first support bracket.

10. The lighting fixture according to claim 1, wherein the circuit board comprises a substrate and an electrical components is located on the substrate, and the first support bracket, the second support bracket and the connection crossbeam form an accommodation space with a door-frame structure, and the accommodation space accommodates the electrical components.

11. The lighting fixture according to claim 1, further comprising two end caps snap-fitted with two ends of the cavity, wherein:

each end cap of the end caps comprises an end groove opening towards the light tube, an end of the cavity protrudes into the end grooves, each end cap of the end caps further comprises two clamping members opposite in a circumferential direction of the end cap, each of the clamping members comprises a clamping plate and two limiting pieces located on two sides of the clamping plate in the length direction of the cavity, and an end of the circuit board in the length direction of the cavity is inserted into a clamping groove formed by the clamping plate and the two limiting pieces.

* * * * *